United States Patent [19]

Brown

[11] Patent Number: 5,004,490

[45] Date of Patent: Apr. 2, 1991

[54] METHOD OF MAKING GLASS SUBSTRATE COATED WITH TIN OXIDE

[75] Inventor: Franklin I. Brown, Riverview, Mich.

[73] Assignee: Ford Motor Company, Dearborn, Mich.

[21] Appl. No.: 83,479

[22] Filed: Aug. 10, 1987

[51] Int. Cl.$^5$ ............................................. C03C 25/02
[52] U.S. Cl. ................................... 60/60.52; 427/166; 427/220
[58] Field of Search ................... 65/60.1, 60.3, 60.51, 65/60.52, 60.53; 427/163, 164, 166, 220

[56] References Cited

U.S. PATENT DOCUMENTS

| | | | |
|---|---|---|---|
| 3,811,918 | 5/1974 | Levene | 65/50.52 X |
| 3,827,871 | 8/1974 | Budd | 65/60.52 |
| 4,140,814 | 2/1979 | Hynecek | 427/166 |
| 4,191,587 | 3/1980 | Kratel et al. | 427/220 |
| 4,252,838 | 2/1981 | Boord et al. | 427/166 |
| 4,530,857 | 7/1985 | Lindner | 65/60.52 |
| 4,590,096 | 5/1986 | Undner | 427/166 |
| 4,707,383 | 11/1987 | Mattes et al. | 427/164 |
| 4,725,452 | 2/1988 | Hargreaves et al. | 65/60.51 |

FOREIGN PATENT DOCUMENTS

60-96591   5/1985   Japan ................... 65/60.52

*Primary Examiner*—Robert L. Lindsay

[57] ABSTRACT

There is disclosed herein, as a new article of manufacutre, a glass substrate coated with tin oxide and a method of making the same. According to the method, in order to produce the new article of manufacture, a glass substrate with a selected surface is heated to a temperature sufficiently hot so that a heat decomposable, tin-containing material coming into the vicinity of the selected surface will be heat decomposed permitting the tin contained in the tin-containing material to be oxidized and deposited as tin oxide on the selected surface. The tin-containing material, which is applied to the heated glass surface is a coating material containing alkyltin alkoxides of the general formula $RSn(OR^1)_3$ where R and $R^1$ are organo groups containing from 1–6 carbon atoms, whereby a thicker coating film of oxidized tin is deposited on the selected surface of the glass substrate than can be deposited by previously used tin coating materials under the same application and temperature conditions. The new product of manufacture has particular utility when used as a "Low E" glass product for building glazings which reflect infrared radiation back into a building in which such glazings are installed thereby to keep the building warmer.

7 Claims, No Drawings

METHOD OF MAKING GLASS SUBSTRATE COATED WITH TIN OXIDE

TECHNICAL FIELD

This disclosure is directed to a glass substrate coated with tin oxide and a method of making the same. The coated glass substrate is manufactured by applying a coating material containing alkyltin alkoxides of certain formulations to a heated surface of the glass substrate to form an adherent tin oxide coating thereon. The so-coated glass substrate may be formed into a low emissivity glass product. Such products are used, because they reflect infrared radiation, in architectural products such as windows in buildings and homes.

BACKGROUND AND PRIOR ART STATEMENT

There is available in the market today, glass substrates, such as large glass windows, which have a tin oxide coating on a selected surface thereof. The purpose of the tin oxide coating is to improve the emissivity value of the window over the emissivity value which it would have without a coating thereon. Normally, the emissivity value of a glass substrate, such as a window, is improved by the application of a tin oxide coating thereto. A clear glass window having a thickness of ⅛inch has an emissivity value of 0.84, whereas such a glass window coated with a tin oxide coating would have an emissivity value in a range of 0.50–0.35.

The lower the emissivity value, the better the coated glass substrate is in reflecting infrared radiation. For example, if such a coated glass substrate is glazed into a window, the coating is effective in reflecting back into the building the infrared radiation produced within the building as, for example, by means of a fuel burning furnace. Most of such infrared radiation would normally pass through an uncoated window, but will have a large proportion thereof reflected back into the building by a properly coated glass window.

The present-day practice for manufacturing such coated glass products is one in which a tin oxide coating is developed on a glass substrate by a pyrolytic application to a heated glass substrate of a coating material. In today's manufacturing processes, the coating material used is one which contains a chemical compound known as monobutyl tin trichloride (MBTC) in a suitable solvent. This chemical compound is sprayed in its dissolved form against a selected surface of a heated glass substrate in an oxidizing atmosphere. The result of such processing is that a coating of oxidized tin is developed on the selected surface of the glass substrate.

With respect to my knowledge of the known prior art, MBTC dissolved in a suitable solvent is the most efficient material known at the present time for the commercial spraying of glass substrates to develop a tin oxide coating thereon. By an efficient material, it is meant that this material, MBTC, will deposit more tin oxide per gram of sprayed tin than any other presently known tin oxide producing material will produce per gram of sprayed tin, assuming, of course, that the spraying conditions are the same for comparison purposes.

One object of my invention is to produce a glass substrate coated with tin oxide in which the glass substrate has a thicker coating of oxidized tin deposited thereon than can be deposited by previously used tin coating materials such as MBTC. It is another object of my invention to provide a method of making a glass substrate coated with tin oxide, which method has a higher efficiency in the formation of such a tin oxide coating on a glass substrate than can be achieved by the use of a method which employs previously known tin oxide producing materials such as MBTC.

BRIEF DESCRIPTION OF THE DISCLOSURE

This disclosure teaches as a new article of manufacture a glass substrate having an adherent tin oxide coating on a selected surface thereof. The disclosure also teaches an improved method of applying an adherent tin oxide coating to a selected surface of a glass substrate. The method of applying a tin oxide coating disclosed herein results in the production of a tin oxide coated glass substrate in which the material applied to develop the tin oxide coating is a more efficient material than known prior art materials. By a more efficient material, it is meant that the material to be disclosed will deposit more tin oxide per gram of sprayed tin than any other tin oxide coating material known in the prior art.

This disclosure teaches as a new article of manufacture a coated glass substrate. The coated glass substrate is manufactured in the following process. A selected surface of the glass substrate is heated to a temperature sufficiently hot so that a heat decomposable, tin-containing material coming into the vicinity of and/or contact with the selected surface of the glass substrate will be heat decomposed permitting the tin contained in the tin-containing material to be oxidized and deposited as tin oxide on the selected surface. After the selected surface of the glass substrate has been heated, a tin-containing material is applied thereto in an oxygen-containing ambient. The tin-containing material is a coating material containing alkyltin alkoxides of the general formula $RSn(OR^1)_3$ where R and $R^1$ are organo groups containing from 1–6 carbon atoms, whereby a thicker coating of oxidized tin is deposited on the selected surface of the glass substrate than can be deposited by previously used tin-containing materials under the same application and temperature conditions.

This disclosure also teaches an improvement in a method of applying an adherent tin oxide coating to a selected surface of a glass substrate. The improved method is one in which the selected surface of the glass substrate is heated to a temperature sufficiently hot so that a heat decomposable tin containing material coming into the vicinity of and/or contact with the selected surface will be heat decomposed permitting the tin contained in the tin-containing material to be oxidized and deposited as tin oxide on the selected surface. Thereafter, the selected surface of the glass substrate has a tin-containing material applied thereto in an oxygen containing ambient. In accordance with the teachings of this disclosure, the above-described method is improved by forming the tin-containing material of a coating material containing alkyltin alkoxides of the general formula $RSn(OR^1)_3$ where R and $R^1$ are organo groups containing from 1–6 carbon atoms, whereby a thicker coating film of oxidized tin is deposited on the selected surface of the glass substrate than can be deposited by previously used tin coating materials under the same application and temperature conditions.

In accordance with some preferred embodiments of the invention taught in the disclosure, the temperature to which the selected surface of the glass substrate is heated, and generally the entire glass substrate as a body is heated, is in a range of 900°–1200° F., preferably 1100° F.

BEST MODE AND INDUSTRIAL APPLICABILITY

The novel features that are considered characteristic of the invention are set forth with particularity in the appended claims. The invention itself, however, both as to its organization and its method of operation, together with additional objects and advantages thereof, will best be understood from the following description of specific embodiments disclosed herein. A Figure has been provided to show the results of certain tests which have been carried out using the most efficient prior art tin-containing coating material compared to the tin-containing coating material taught in this disclosure.

The following description is what I consider to be preferred embodiments of the new glass substrate coated with tin oxide and method of making the same of my invention. The following description also sets forth what I now contemplate to be the best mode of making the glass substrate coated with tin oxide in accordance with my invention. The description is not intended to be a limitation upon the broader principles of this disclosure, but is set forth herein to teach the best mode of my invention as presently known to me.

As has been described in the Background and Prior Art Statement portion of this disclosure, it is known in the art that a thin, functional coating of tin oxide can be placed on a glass substrate to promote reflectivity of infrared radiation. A so-coated glass substrate, made into an architectural glass product such as a glass window for a building is known in the trade as a "Low E" glass product.

Such Low E glass products are useful in providing architectural glazing products with enhanced insulating value because they reflect infrared radiation back into the interior of a building in which they are installed. Infrared radiation is a product of fuel burned in the building. If the infrared radiation is allowed to escape through such glazings, more fuel will be required to keep the building at the same temperature than if such radiation is trapped and kept within the building. Thus, Low E glass products are finding more use as architectural glazings because of their superior insulating value over glass products which do not have such a coating thereon.

As has also been discussed above, skilled artisans have used monobutyltin trichloride (MBTC) as a material for developing a tin oxide coating on glass substrates. This disclosure teaches a glass substrate coated with tin oxide and a method of making the same in which the coating of oxidized tin is applied in a more efficient manner, that is, more coating material is applied per unit of tin contained in the coating material than is obtained from conventionally applied MBTC coating materials.

The glass substrate and method of coating the same with tin oxide, in accordance with the teachings of my invention, utilizes as a coating material alkyltin alkoxides of the general formula $RSn[OR^1]_3$ where $R$ and $R^1$ are organo groups containing from 1–6 carbons atoms. Such alkyltin alkoxides are the primary material used to supply the tin component for the oxidized tin coating which is developed as a coating on a selected surface of a heated glass substrate in accordance with the teachings of my invention.

Such alkyltin alkoxides can be synthesized as taught by D.C. Bradley and W. Wardlaw in *Metal Alkoxides*, 1980, p. 165, published by Academic Press, N.Y., N.Y. The synthesis is carried out in such a manner that the appropriate alkyltin alkoxide is produced along with ammonium chloride. The ammonium chloride is filtered off and the desired alkyltin alkoxide is thereafter dissolved in a suitable solvent, such as a polar organic solvent (e.g. an alcohol) so that it may be used to make the glass substrate coated with tin oxide as taught in this disclosure by the preferred method of making the same, which is also taught in this disclosure. Since a full disclosure of the method of making the alkyltin alkoxides is set forth in the Bradley et al citation, no further discussion thereof will be undertaken herein.

COMPARISON TESTS

A number of tests were carried out to show the greater efficiency achieved using the teachings of my invention over the coating efficiency achieved by using the previously known MBTC materials to generate a tin oxide coating on a selected surface of a glass substrate. The test results are depicted in the Figure supplied with this disclosure in the form of a chart. The chart discloses the test number, compound tested, whether the compound was in dilute or concentrated form, the rate of exhaust of materials from the vicinity of application of a sprayed material onto a heated glass surface in cubic feet per minute, and the film thickness produced under such conditions in nanometers (nm). The exact manner in which the test were carried out to obtain the data set forth in the Figure is described below.

PROCEDURE

The alkyltin alkoxide solutions used in order to obtain the information set forth in the Figure were both dilute and concentrated solutions of butyltin methoxide $[C_4H_9Sn(OCH_3)_3]$ dissolved in methanol and butyltin butoxide $[C_4H_9Sn(OC_4H_9)_3]$ dissolved in butanol to represent the materials used to make the glass substrate coated with tin oxide in accordance with the teachings of my invention. These solutions are compared in the Figure against solutions of MBTC in methanol or butanol, as the case may be, as being standard solutions of the type now used in the industry to make Low E glass products. In concentrated form, the organic portion of the solution is 75% by weight and the tin is 25% by weight of the solution. In dilute form, the organic portion of the solution is 90% by weight and the tin is 10% by weight of the solution. In accordance with my invention, these are the preferred compositions for the concentrated and dilute solutions.

When solutions are compared against each other, each of the compared solutions has the same grams of tin per gram of solution. Thus, the solutions sprayed are identical in tin content, and if film thickness from a particular solution is greater, then that solution is more efficient because it is laying down a greater amount of tin oxide per unit of sprayed tin.

All of the testing reported in the Figure was carried out in the same manner. The test procedure will be described below. The only difference in testing procedure is the exhaust rate of withdrawal of materials from the area of spraying. As reported in the Figure, the exhaust rate was selected as either 4 or 12 cubic feet per minute. The testing procedure is one in which individual sheets of soda/lime silica glass ($4 \times 4 \times \frac{1}{8}$ inch sample) are coated. Individual test samples are laid on a flat graphite sheet slightly larger than the sample, the graphite sheet in turn being laid on a radiant heat source contained within a furnace. The furnace is conical in shape, the middle portion being openable so that a sample on the graphite sheet may be inserted therein.

At the top of the conical furnace, approximately 11 inches above the surface of a glass sample contained on the graphite sheet, there is mounted a spray gun in a fixed position. This spray gun is used to apply a selected coating material, at a pressure of about 40 psi, onto a glass sample located therebelow. At a location spaced below the glass sample, there is mounted a suction fan for exhausting materials from the interior of the furnace. The exhaust operates in a manner that excessive spray materials are exhausted around the side edges of the glass sample to suitable exhaust plenum.

A typical coating procedure is as follows. A glass sample is placed on the graphite sheet. The graphite sheet is then placed on the radiant heater in the furnace and the furnace closed but not sealed so that the air surrounding the furnace may be drawn therein. The furnace heats the glass sample to a temperature in a range of 900°–1200° F., preferably 1100° F. The surface of the glass sheet facing the spray gun has a small thermocouple placed thereagainst to measure the temperature of that surface.

In carrying out the tests of this procedure, spraying of a test glass sample occurs once there is an indication by the thermocouple that the surface of the glass sample has been heated to a temperature of 1100° F. Before carrying out the test, the suction fan is turned on and set for an exhaust rate of 4 or 12 cubic feet per minute, such action also drawing ambient air into the furnace as the exhaust medium. Thereafter, a test sample is sprayed with the test solution for a period of six seconds during which the excessive spray materials are exhausted from the vicinity of contact with the hot glass sample. During the spraying, the glass sample is sufficiently hot that some of the heat decomposable, tin-containing material coming into the vicinity of and/or contact with the test sample will be heat decomposed permitting the tin contained in the tin containing material to be oxidized and deposited as tin oxide on the test sample. After spraying, individual test samples are cooled and coating thickness measurements are made thereon.

DISCUSSION OF RESULTS

The test results for Tests 1 and 2 reported in the Figure filed with this disclosure, indicate that the glass substrate coated with tin oxide using butyltin methoxide had a coating thickness of 316 nm which was greater than the thickness of 309 nm obtained under the same conditions using MBTC as the material for generating the tin oxide coating on the glass substrate. This shows that the butyltin methoxide compound, which is one of the alkyltin alkoxides disclosed by me as being more efficient in forming a tin oxide coating, was in fact more efficient than the previously known and used MBTC material.

Even more striking evidence of this improvement is seen in the results from Tests 3 and 4 of the Figure wherein a concentrated form of butyltin methoxide is compared with a concentrated form of MBTC. The results of Test 3 show that butyltin methoxide produced a coating thickness of 521 nm while the results of Test 4 show the MBTC material produced a coating thickness of 439 nm. This, once again, shows the advantage of the particular family of compounds disclosed by me over that of the known prior art in generating a glass substrate with an adherent tin oxide coating of greater thickness on a selected surface thereof.

In the third set of comparative data set forth in the Figure, that is, Tests 5 and 6, butyltin butoxide is compared in concentrated form at an exhaust rate of 4 cubic feet per minute with concentrated MBTC at the same exhaust rate. Once again, this comparative data shows that with Test 5 using the butyltin butoxide at an exhaust rate of 4 cubic feet per minute, the resulting tin oxide coating had a thickness of 211 nm. It is, of course, readily apparent that this is a greater thickness than that of 178 nm obtained in Test 6 for the MBTC which in this particular test was dissolved in butanol. Once again, the comparative data of Tests 5 and 6 shows that the alkyltin alkoxide compound is a more efficient compound than the previously known MBTC.

In Tests 7 and 8, Tests 5 and 6 are repeated with the exception that the exhaust rate is increased to 12 cubic feet per minute. Once again, the coating thickness developed by the butyltin butoxide of 292 nm is greater than the thickness of 283 nm for the MBTC. Thus, once again, the efficiency of the alkyltin alkoxide is demonstrated over the previously known, most efficient tin oxide forming material, that is, MBTC.

As a result of my testing, I have been able to set forth in this disclosure teachings with regard to a new article of manufacture in which a glass substrate has an adherent tin oxide coating developed on a selected surface thereof in a more efficient manner than known previously. I am also able to teach an improvement in a method of applying an adherent tin oxide coating to a selected surface of a glass substrate. The method is improved by using an alkyltin alkoxide compound of the general formula which has been described above.

While particular embodiments of these inventions have been illustrated and described, it will be obvious to those skilled in the art that various changes and modifications may be made without departing from the invention, and it is intended to cover in the appended claims all such modifications and equivalents as fall within the true spirit and scope of the invention.

I claim:

1. In a method of applying a tin oxide coating to a selected surface of a glass substrate in which said selected surface of said glass substrate is heated to a temperature sufficiently hot so that a heat decomposable tin-containing material coming into the vicinity of said selected surface will be heat decomposed permitting said tin contained in said tin-containing material to be oxidized and deposited as tin oxide on said selected surface, and in which a tin-containing material is applied in an oxygen containing ambient to said heated selected surface of said glass substrate, the improvement comprising:

forming said tin-containing material of a coating material containing alkyltin alkoxides of the general formula $RSn(OR^1)_3$ where R and $R^1$ are alkyl groups containing from 1-6 carbon atoms, whereby a coating film of oxidized tin is deposited on said selected surface of said glass substrate.

2. The method of claim 1 wherein: said selected surface of said glass substrate is heated to a temperature in a range from 900° to 1200° F.

3. The method of claim 1 wherein: said alkyltin alkoxide is butyltin methoxide.

4. The method of claim 1 wherein: said alkyltin alkoxide is butyltin butoxide.

5. The method of claim 1 wherein: said coating material is a tin-containing material which contains from about 10% to about 25% by weight of tin.

6. A method of making a coated glass product including:

heating a glass substrate;

applying a heat decomposable tin-containing material to said heated glass substrate, said material containing alkyltin alkoxides of the general formula $RSn(OR^1)_3$ where R and $R^1$ are alkyl groups containing from 1–6 carbon atoms;

said tin-containing material being applied to said glass substrate in an oxygen containing ambient whereby said material decomposes to form a tin oxide coating on said glass substrate.

7. In a method of applying a tin oxide coating to a selected surface of a glass substrate in which said selected surface of said glass substrate is heated to a temperature in a range from 900° F. to 1200° F. so that a heat decomposable tin-containing material coming into the vicinity of said selected surface will be heat decomposed permitting said tin contained in said tin-containing material to be oxidized and deposited as tin oxide on said selected surface, and in which a tin-containing material is applied in an oxygen containing ambient to said heated selected surface of said glass substrate, the improvement comprising:

forming said tin-containing material so as to contain from about 10% to 25% by weight of tin in the form of alkyltin alkoxides of the general formula $RSn(OR^1)_3$ where R and $R^1$ are alkyl groups containing 1–6 carbon atoms, whereby a coating film of oxidized tin is deposited on said selected surface of said glass substrate.

* * * * *